(12) United States Patent
Facchini et al.

(10) Patent No.: US 6,481,791 B1
(45) Date of Patent: Nov. 19, 2002

(54) CHILD CAR-SEAT/CARRIER COVER

(76) Inventors: Mylene Facchini, 2310 Wildwood Crescent, Pickering Ontario (CA), L1X-2R8; Roberto Facchini, 2310 Wildwood Crescent, Pickering Ontario (CA), L1X-2R8

( * ) Notice: Subject to any disclaimer, the term of this patent is extended or adjusted under 35 U.S.C. 154(b) by 0 days.

(21) Appl. No.: 09/770,258

(22) Filed: Jan. 26, 2001

(51) Int. Cl.[7] .............................. A47C 29/00; A47C 7/66
(52) U.S. Cl. .............................. 297/184.13; 297/184.1; 297/184.11; 297/184.12; 297/184.14; 5/416
(58) Field of Search ........................ 297/219.12, 184.1, 297/184.11, 184.12, 184.13, 184.14, 188.01, 224, 225, 229; 5/416

(56) References Cited

U.S. PATENT DOCUMENTS

| | | | | |
|---|---|---|---|---|
| 4,694,511 A | * | 9/1987 | Estes et al. | ............. 297/225 X |
| 4,923,104 A | * | 5/1990 | Rice et al. | ................... 224/155 |
| 4,946,221 A | | 8/1990 | Livingston | ............. 297/184.13 |
| 5,074,616 A | * | 12/1991 | Smith | ........................ 5/416 X |
| 5,243,724 A | * | 9/1993 | Barnes | .............. 297/219.12 X |
| 5,309,586 A | | 5/1994 | Sies et al. | ........... 297/184.13 X |
| 5,333,769 A | | 8/1994 | Skroski | |
| 5,482,352 A | * | 1/1996 | Leal et al. | .......... 297/188.01 X |
| 5,549,354 A | | 8/1996 | Rosen | .................... 297/184.13 |
| 5,618,082 A | * | 4/1997 | Jachmich | ..................... 297/229 |
| 5,624,156 A | * | 4/1997 | Leal et al. | .......... 297/319.12 X |
| D384,188 S | | 9/1997 | Imm | |
| 5,730,490 A | | 3/1998 | Mortenson | ............. 297/184.13 |
| 5,988,742 A | * | 11/1999 | Stevens | ............. 297/184.13 X |
| 6,012,184 A | * | 1/2000 | Childers | ........................ 5/416 |
| 6,056,355 A | * | 5/2000 | Klassen | ............. 297/184.1 X |
| 6,209,953 B1 | * | 4/2001 | Mackay et al. | ...... 297/184.1 X |

* cited by examiner

Primary Examiner—Rodney B. White

(57) ABSTRACT

A child car-seat/carrier cover for protecting a child from the elements of the environment. The child car-seat/carrier cover includes a sheet of material having a hole being disposed through near a top end thereof and being adapted to allow a user to extend one's hand therethrough, and further having an opening being disposed through a central portion thereof; and also includes an elastic band being securely attached to the sheet of material for tightly fitting the sheet of material about a car seat/carrier; and further includes a flap member being securely attached along an edge forming said opening in the sheet of material and being fastenably closed over the opening with fasteners; and also includes a pocket assembly being securely attached to the sheet of material for holding and storing items.

12 Claims, 2 Drawing Sheets

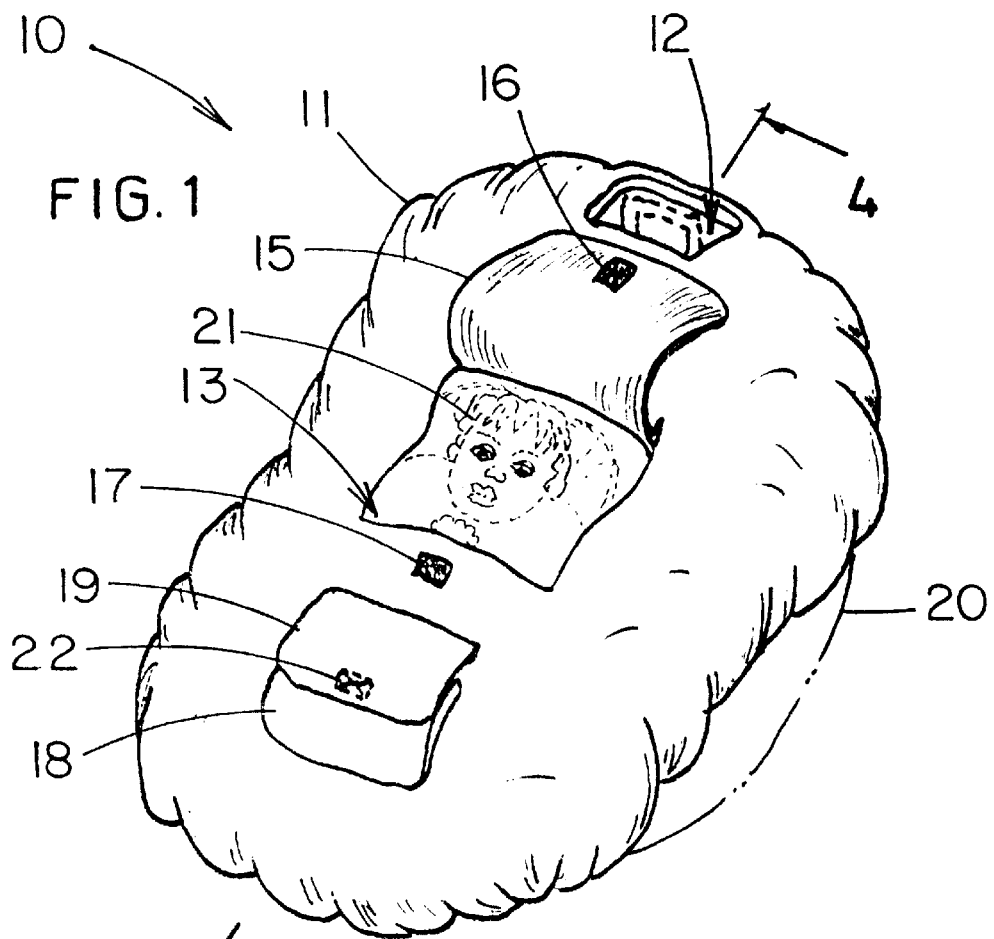
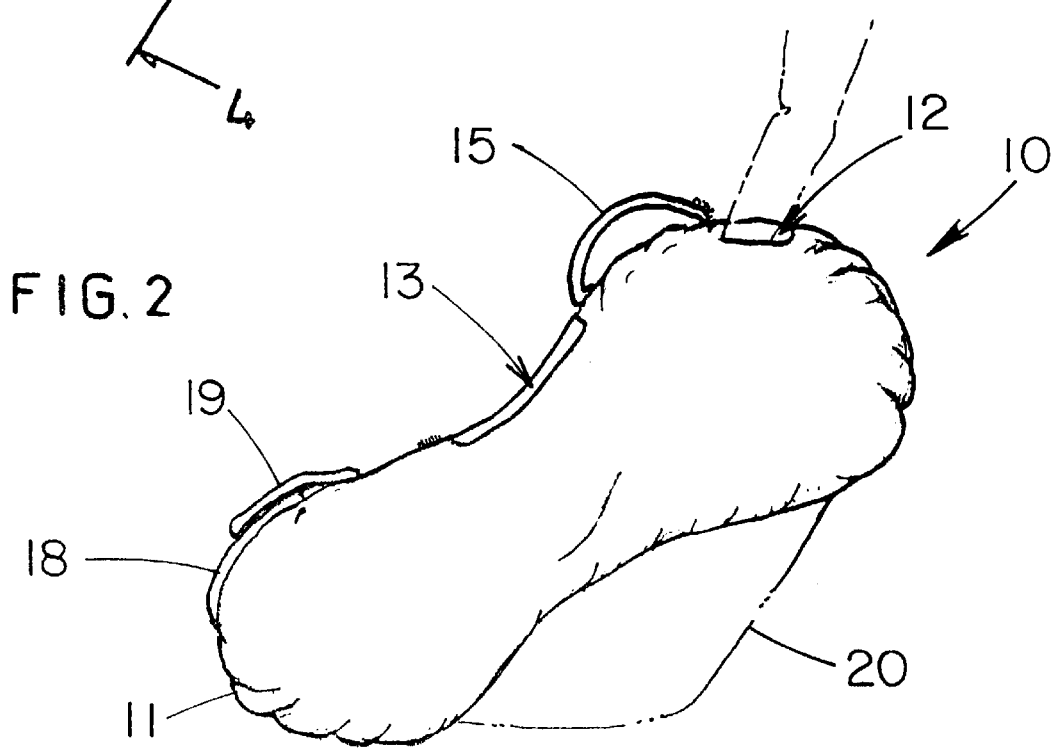

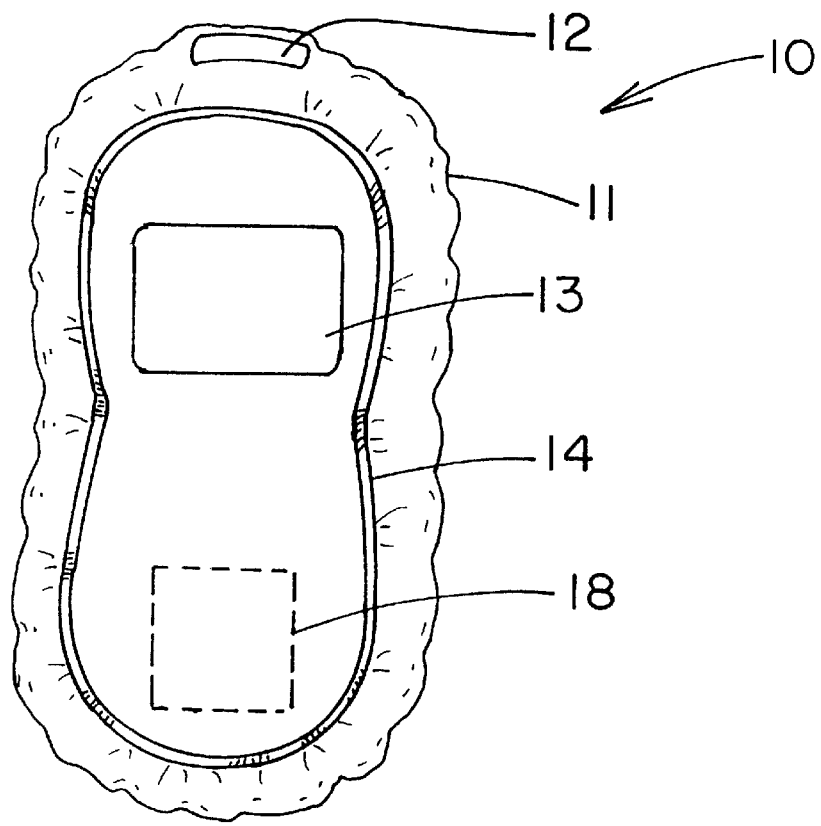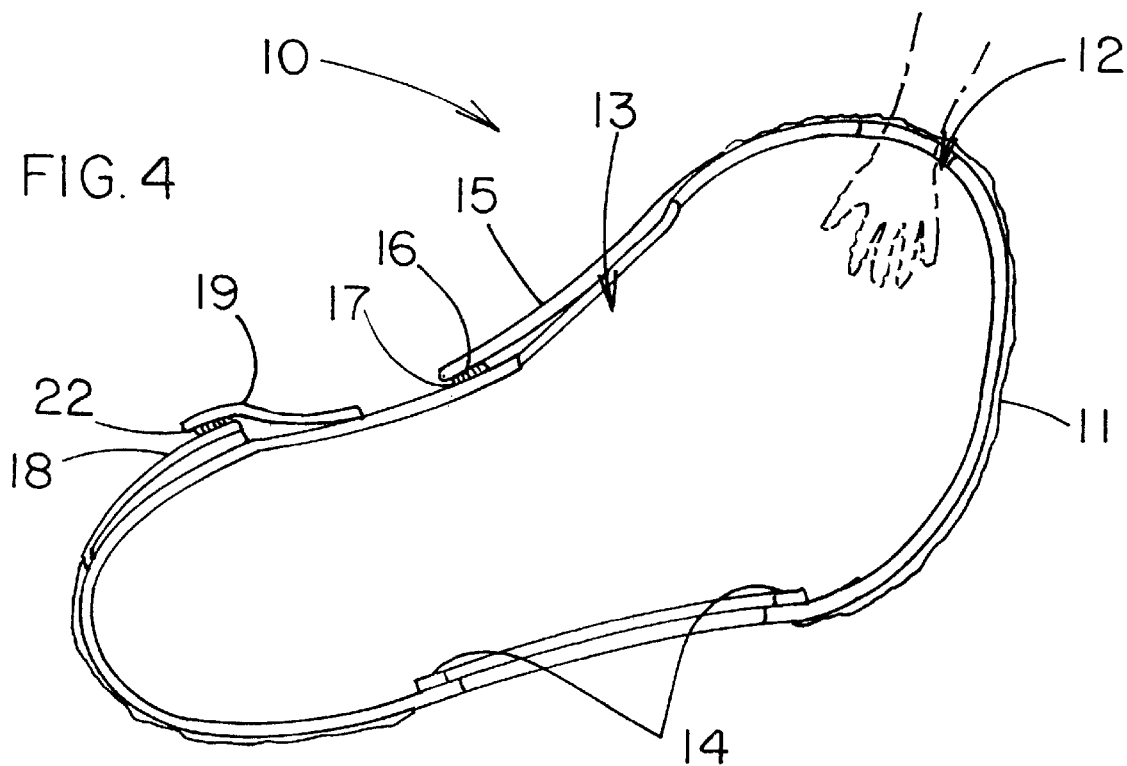

CHILD CAR-SEAT/CARRIER COVER

BACKGROUND OF THE INVENTION

1. Field of the Invention

The present invention relates to a carrier cover and more particularly pertains to a new child car-seat/carrier cover for protecting a child from the elements of the environment.

2. Description of the Prior Art

The use of a carrier cover is known in the prior art. More specifically, a carrier cover heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,946,221; U.S. Pat. No. 5,549,354; U.S. Pat. No. Des. 384,188; U.S. Pat. No. 5,730,490; U.S. Pat. No. 5,333,769; and U.S. Pat. No. 5,309,586.

While these devices fulfill their respective, particular objectives and requirements, the aforementioned patents do not disclose a new child car-seat/carrier cover. The inventive device includes a sheet of material having a hole being disposed through near a top end thereof and being adapted to allow a user to extend one's hand therethrough, and further having an opening being disposed through a central portion thereof; and also includes an elastic band being securely attached to the sheet of material for tightly fitting the sheet of material about a car seat/carrier; and further includes a flap member being securely attached along an edge forming said opening in the sheet of material and being fastenably closed over the opening with fasteners; and also includes a pocket assembly being securely attached to the sheet of material for holding and storing items.

In these respects, the child car-seat/carrier cover according to the present invention substantially departs from the conventional concepts and designs of the prior art, and in so doing provides an apparatus primarily developed for the purpose of protecting a child from the elements of the environment.

SUMMARY OF THE INVENTION

In view of the foregoing disadvantages inherent in the known types of carrier cover now present in the prior art, the present invention provides a new child car-seat/carrier cover construction wherein the same can be utilized for protecting a child from the elements of the environment.

The general purpose of the present invention, which will be described subsequently in greater detail, is to provide a new child car-seat/carrier cover which has many of the advantages of the carrier cover mentioned heretofore and many novel features that result in a new child car-seat/carrier cover which is not anticipated, rendered obvious, suggested, or even implied by any of the prior art carrier cover, either alone or in any combination thereof.

To attain this, the present invention generally comprises a sheet of material having a hole being disposed through near a top end thereof and being adapted to allow a user to extend one's hand therethrough, and further having an opening being disposed through a central portion thereof; and also includes an elastic band being securely attached to the sheet of material for tightly fitting the sheet of material about a car seat/ carrier; and further includes a flap member being securely attached along an edge forming said opening in the sheet of material and being fastenably closed over the opening with fasteners; and also includes a pocket assembly being securely attached to the sheet of material for holding and storing items.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new child car-seat/carrier cover which has many of the advantages of the carrier cover mentioned heretofore and many novel features that result in a new child car-seat/carrier cover which is not anticipated, rendered obvious, suggested, or even implied by any of the prior art carrier cover, either alone- or in any combination thereof.

It is another object of the present invention to provide a new child car-seat/carrier cover which may be easily and efficiently manufactured and marketed.

It is a further object of the present invention to provide a new child car-seat/carrier cover which is of a durable and reliable construction.

An even further object of the present invention is to provide a new child car-seat/carrier cover which is susceptible of a low cost of manufacture with regard to both materials and labor, and which accordingly is then susceptible of low prices of sale to the consuming public, thereby making such child car-seat/carrier cover economically available to the buying public.

Still yet another object of the present invention is to provide a new child car-seat/carrier cover which provides in the apparatuses and methods of the prior art some of the advantages thereof, while simultaneously overcoming some of the disadvantages normally associated therewith.

Still another object of the present invention is to provide a new child car-seat/carrier cover for protecting a child from the elements of the environment.

Yet another object of the present invention is to provide a new child car-seat/carrier cover which includes a sheet of material having a hole being disposed through near a top end thereof and being adapted to allow a user to extend one's hand therethrough, and further having an opening being disposed through a central portion thereof; and also includes an elastic band being securely attached to the sheet of material for tightly fitting the sheet of material about a car seat/carrier; and further includes a flap member being securely attached along an edge forming said opening in the sheet of material and being fastenably closed over the opening with fasteners; and also includes a pocket assembly being securely attached to the sheet of material for holding and storing items.

Still yet another object of the present invention is to provide a new child car-seat/carrier cover that is easy and convenient to tightly fit the child car-seat/carrier cover about the car seat or carrier.

Even still another object of the present invention is to provide a new child car-seat/carrier cover that keeps the child warm when being carried outdoors during cold weather.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new child car-seat/carrier cover according to the present invention and shown in use.

FIG. 2 is a side elevational view of the present invention shown in use.

FIG. 3 is a bottom plan view of the present invention.

FIG. 4 is a cross-sectional view of the present invention.

DESCRIPTION OF THE PREFERRED EMBODIMENT

With reference now to the drawings, and in particular to FIGS. 1 through 4 thereof, a new child car-seat/carrier cover embodying the principles and concepts of the present invention and generally designated by the reference numeral 10 will be described.

As best illustrated in FIGS. 1 through 4, the child car-seat/carrier cover 10 generally comprises a sheet of material 11 having a hole 12 being disposed through near a top end thereof and being adapted to allow a user to extend one's hand therethrough, and further having an opening 13 being disposed through a central portion thereof. The sheet of material 11 is generally a blanket having a definite thickness and having layers with material disposed between the layers. The opening 13 is adapted to allow a child 21 seated in the car seat/carrier 20 to see therethrough.

An elastic band 14 is securely and conventionally attached to the sheet of material 11 for tightly fitting the sheet of material 11 about a car seat/carrier 20. The elastic band 14 is securely and conventionally attached along an edge of the sheet of material 11 and is adapted to tightly fit about the car seat/carrier 20.

A flap member 15 is securely and conventionally attached along an edge forming the opening 13 in the sheet of material 11 and is fastenably closed over the opening 13 with fasteners 16,17. The flap member 15 is a piece of material which is securely attached along a top edge of the opening 13 of the sheet of material 11. The fasteners 16,17 are securely and conventionally attached near a bottom of the flap member 15 and below a bottom edge of the opening 13 of the sheet of material 11. The fasteners 16,17 are strips of hook and loops fasteners.

A pocket assembly is securely and conventionally attached and sewn to the sheet of material 11 for holding and storing items. The pocket assembly includes a pocket 18 is securely and conventionally attached to the sheet of material 11 below the opening 13, and also includes a pocket flap 19 which is securely and conventionally attached to the sheet of material 11 above the pocket 18 and is adapted to fastenably close the pocket with fastening members 22.

In use, the child is seated in the car seat or the carrier 20, and the user places the sheet of material 11 over the car seat or carrier 20 with the elastic band 14 being engagable to the sides of the car seat or carrier 20 to secure the sheet of material 11 to the car seat or carrier and to prevent the child 21 from kicking the sheet of material 11 off the car seat or carrier 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A child car-seat/carrier cover comprising:

a sheet of material having a hole being disposed through near a top end thereof and being adapted to allow a user to extend one's hand therethrough, and further having an opening being disposed through a central portion thereof;

an elastic band being securely attached to said sheet of material for tightly fitting said sheet of material about a car seat/carrier;

a flap member being securely attached along an edge forming said opening in said sheet of material and being fastenably closed over said opening with fasteners; and a pocket assembly being securely attached to said sheet of material for holding and storing items;

wherein said sheet of material is generally a blanket having a definite thickness and having layers with material disposed between said layers.

2. A child car-seat/carrier cover as described in claim 1, wherein said opening is adapted to allow a child seated in the car seat/carrier to see therethrough.

3. A child car-seat/carrier cover as described in claim 1, wherein said elastic band is securely attached along an edge of said sheet of material and is adapted to tightly fit about the car seat/carrier.

4. A child car-seat/carrier cover as described in claim 1, wherein said flap member is a piece of material which is securely attached along a top edge of said opening of said sheet of material.

5. A child car-seat/carrier cover as described in claim 1, wherein said fasteners are securely attached near a bottom of said flap member and below a bottom edge of said opening of said sheet of material, said fasteners being strips of hook and loops fasteners.

6. A child car-seat/carrier cover as described in claim 1, wherein said pocket assembly includes a pocket being securely attached to said sheet of material below said opening, and also includes a pocket flap which is securely attached to said sheet of material above said pocket and being adapted to fastenably close said pocket with fastening members.

7. A child car-seat/carrier cover comprising:

a sheet of material having a hole being disposed through near a top end thereof and being adapted to allow a user to extend one's hand therethrough, and further having an opening being disposed through a central portion thereof, said sheet of material being generally a blanket having a definite thickness and having layers with material disposed between said layers, said opening being adapted to allow a child seated in the car seat/carrier to see therethrough;

an elastic band being securely attached to said sheet of material for tightly fitting said sheet of material about a car seat/carrier, said elastic band being securely attached along an edge of said sheet of material and being adapted to tightly fit about the car seat/carrier;

a flap member being securely attached along an edge forming said opening in said sheet of material and being fastenably closed over said opening with fasteners, said flap member being a piece of material which is securely attached along a top edge of said opening of said sheet of material, said fasteners being securely attached near a bottom of said flap member and below a bottom edge of said opening of said sheet of material, said fasteners being strips of hook and loops fasteners; and a pocket assembly being securely attached to said sheet of material for holding and storing items, said pocket assembly including a pocket being securely attached to said sheet of material below said opening, and also including a pocket flap which is securely attached to said sheet of material above said pocket and being adapted to fastenably close said pocket with fastening members.

8. A child car-seat/carrier cover comprising:

a sheet of material having a first end and a second end and a perimeter edge, a hole being disposed through said sheet of material near said first end thereof for allowing a user to extend one's hand therethrough, an opening being disposed through a central portion of said sheet of material between said first and second ends;

an elastic band being securely attached to said sheet of material adjacent the perimeter edge thereof for tightly fitting said sheet of material about a car seat/carrier;

a flap member being securely attached to said sheet of material adjacent to an edge forming said opening and being releasably closable over said opening with fasteners;

a pocket assembly being, securely attached to said sheet of material for holding and storing items, said pocket being located generally between said opening in said sheet of material and said second end of said sheet of material; and wherein said sheet of material is generally a blanket having layers with material disposed between said layers.

9. A child car-seat/carrier cover as described in claim 8 wherein said opening is adapted to allow a child seated in the car seat/carrier to see therethrough.

10. A child car-seat/carrier cover as described in claim 8 wherein said elastic band is securely attached along an edge of said sheet of material and is adapted to tightly fit about the car seat/carrier.

11. A child car-seat/carrier cover as described in claim 8 wherein said flap member is a piece of material which is securely attached along a top edge of said opening of said sheet of material.

12. A child car-seat/carrier cover as described in claim 8 wherein said fasteners are securely attached near a bottom of said flap member and below a bottom edge of said opening of said sheet of material, said fasteners being strips of hook and loops fasteners.

* * * * *